US010547133B1

(12) United States Patent
Consoli et al.

(10) Patent No.: US 10,547,133 B1
(45) Date of Patent: Jan. 28, 2020

(54) VERTICAL COMMUNICATION SYSTEM

(71) Applicant: TE CONNECTIVITY CORPORATION, Berwyn, PA (US)

(72) Inventors: John Joseph Consoli, Harrisburg, PA (US); Chad William Morgan, Carneys Point, NJ (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 16/221,714

(22) Filed: Dec. 17, 2018

(51) Int. Cl.
H01R 13/629 (2006.01)
H01R 12/72 (2011.01)
H01R 13/6581 (2011.01)

(52) U.S. Cl.
CPC .......... H01R 12/72 (2013.01); H01R 13/629 (2013.01); H01R 13/6581 (2013.01)

(58) Field of Classification Search
CPC .............. H01R 13/6594; H01R 13/629; H01R 13/62905; H01R 12/7005
USPC ............................ 439/64, 61, 607.2, 607.21
See application file for complete search history.

(56) References Cited

U.S. PATENT DOCUMENTS

| 6,893,293 | B2* | 5/2005 | Ice | G02B 6/4277 |
| | | | | 439/607.2 |
| 7,001,217 | B2* | 2/2006 | Bright | G02B 6/4201 |
| | | | | 439/607.2 |
| 7,780,361 | B2* | 8/2010 | Harris | G02B 6/4246 |
| | | | | 361/697 |
| 8,382,509 | B2 | 2/2013 | David et al. | |
| 8,622,770 | B2* | 1/2014 | Teo | G02B 6/4277 |
| | | | | 439/607.2 |

FOREIGN PATENT DOCUMENTS

| TW | I549381 B | 9/2016 |
| TW | M546613 U | 8/2017 |
| WO | 2016179263 A1 | 11/2016 |

* cited by examiner

Primary Examiner — Hien D Vu

(57) ABSTRACT

A communication system includes a receptacle connector assembly and a pluggable module. The receptacle connector assembly includes a receptacle cage and a communication connector received in the receptacle cage and mounted to a host circuit board. The communication connector includes a connector housing holding contacts and extending between a front and a rear with a bottom of the connector housing mounted to the host circuit board and a longitudinal card slot open at a top of the connector housing. The pluggable module is received in the module channel in a loading direction and includes a module body and a plug board having a mating edge. The plug board is held in the module body in a vertical orientation with the mating edge at a bottom of the plug board being received in the card slot with the contact pads electrically coupled to corresponding contacts of the communication connector.

18 Claims, 8 Drawing Sheets

VERTICAL COMMUNICATION SYSTEM

BACKGROUND OF THE INVENTION

The subject matter herein relates generally to communication systems.

Some communication systems utilize communication connectors to interconnect various components of the system for data communication. Some known communication systems use pluggable modules, such as I/O modules, that are electrically connected to the communication connector in a receptacle cage. In conventional communication systems, the communication connector is provided at the rear end of the receptacle cage behind the pluggable module adding to the overall length of the footprint of the receptacle cage on the host circuit board. Additionally, increasing density of the communication connector and the pluggable module is difficult due to the limited width available to fit contacts of the communication connector and contact pads of the pluggable module. It is difficult to provide adequate shielding in the space available to achieve desired high-speed signal integrity performance. Moreover, conventional communication systems have problems with heat dissipation of the pluggable modules, particularly with the lower pluggable modules in a stacked receptacle cage. It is difficult to mate a heat sink to the pluggable module in the lower channel of the stacked receptacle cage. It is difficult to provide airflow across a heat sink in thermal contact with the pluggable module in the lower channel.

A need remains for a communication system having high density with adequate shielding of signals. A need remains for a communication system providing heat dissipation for components thereof.

BRIEF DESCRIPTION OF THE INVENTION

In one embodiment, a communication system includes a receptacle connector assembly and a pluggable module. The receptacle connector assembly includes a receptacle cage and a communication connector received in the receptacle cage and mounted to a host circuit board. The receptacle cage includes walls defining a cavity including a top wall, a first side wall and a second side wall. The top wall, the first side wall and the second side wall extend longitudinally between a front and a rear of the receptacle cage. The first and second side walls extend from the top wall to a bottom of the receptacle cage mounted to the host circuit board. The cavity includes a module channel between the first and second side walls. The communication connector includes a connector housing holding contacts. The connector housing extends between a front and a rear. A bottom of the connector housing is mounted to the host circuit board. The connector housing includes a card slot open at a top of the connector housing. The card slot extends along a longitudinal axis between the front and the rear of the connector housing. The contacts are arranged along the longitudinal axis. The pluggable module is received in the module channel in a loading direction. The pluggable module includes a module body having a top, a bottom, a first side, a second side, a first end, and a second end. The first end is loaded into the receptacle cage. The pluggable module includes a plug board having a mating edge and contact pads arranged along the mating edge. The plug board is held in the module body in a vertical orientation with the mating edge at a bottom of the plug board. The mating edge is received in the card slot with the contact pads electrically coupled to corresponding contacts of the communication connector.

In another embodiment, a receptacle connector assembly is provided for a communication system and includes a receptacle cage and a communication connector received in the receptacle cage. The receptacle cage includes walls defining a cavity including a top wall, a first side wall and a second side wall. The top wall, the first side wall and the second side wall extend along a longitudinal axis between a front and a rear of the receptacle cage. The first and second side walls extend from the top wall to a bottom of the receptacle cage. The bottom is mounted to a host circuit board. The cavity includes a module channel between the first and second side walls configured to receive a pluggable module in a loading direction parallel to the longitudinal axis. The communication connector includes a connector housing holding contacts. The connector housing extends between a front and a rear. A bottom of the connector housing is mounted to the host circuit board. The connector housing includes a card slot open at a top of the connector housing for receiving a plug board of the pluggable module. The card slot extends along the longitudinal axis between the front and the rear of the connector housing. The contacts are arranged at different depths along the longitudinal axis for mating with corresponding contact pads of the plug board.

In a further embodiment, a pluggable module is provided for a communication system including a receptacle connector assembly having a receptacle cage and a communication connector received in the receptacle cage mounted to a host circuit board and including a module channel extending longitudinally between a front and a rear of the receptacle cage with the communication connector including a connector housing holding contacts in a card slot open at a top of the connector housing and extending along a longitudinal axis between a front and a rear of the connector housing. The pluggable module includes a module body having a top, a bottom, a first side, a second side, a first end, and a second end. The first end is configured to be loaded into the module channel in a loading direction parallel to the longitudinal axis. The pluggable module includes a plug board having a first surface and a second surface. The plug board has a mating edge at a bottom of the plug board. The plug board includes contact pads on at least one of the first surface and the second surface. The contact pads are arranged along the mating edge at the bottom of the plug board. The plug board is held in the module body in a vertical orientation with the mating edge at the bottom of the module body for mating with the communication connector. The mating edge is configured to be received in the card slot of the connector housing with the contact pads electrically coupled to corresponding contacts of the communication connector. The pluggable module includes a cable coupled to the plug board. The cable extends from the second end of the module body.

DETAILED DESCRIPTION OF THE INVENTION

Figure 1:
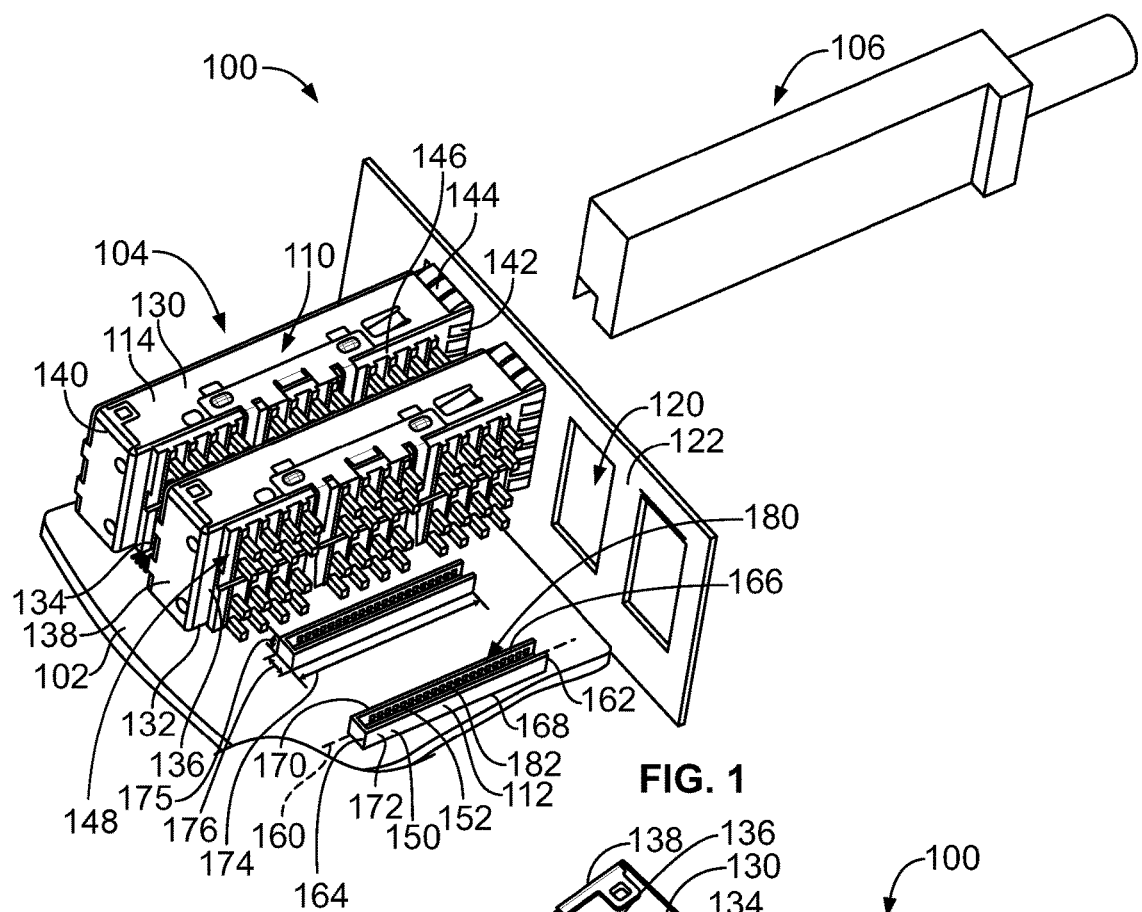
FIG. 1 is a rear perspective view of a communication system formed in accordance with an exemplary embodiment.
Figure 2:
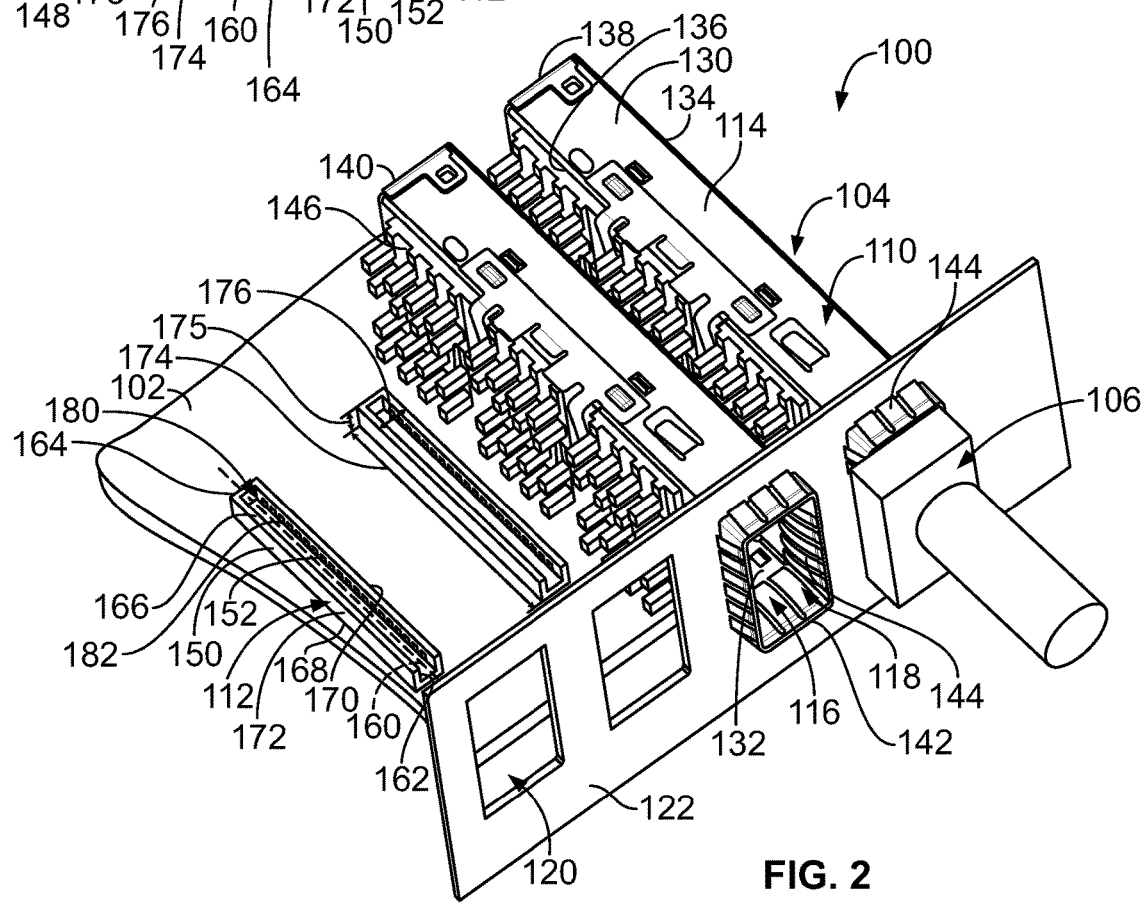
FIG. 2 is a front perspective view of the communication system formed in accordance with an exemplary embodiment.

FIG. 1 is a rear perspective view of a communication system 100 formed in accordance with an exemplary embodiment. FIG. 2 is a front perspective view of the communication system 100 formed in accordance with an exemplary embodiment. The communication system 100 includes a host circuit board 102 and a receptacle connector assembly 104 mounted to the host circuit board 102. Pluggable modules 106 are configured to be electrically connected to the receptacle connector assembly 104. The pluggable modules 106 are electrically connected to the host circuit board 102 through the receptacle connector assembly 104.

In an exemplary embodiment, the receptacle connector assembly 104 includes a receptacle cage 110 (two of which are shown in FIGS. 1 and 2) and a communication connector 112 (two of which are shown in FIGS. 1 and 2) configured to be located in the receptacle cage 110 for mating with the corresponding pluggable module 106 loaded in the receptacle cage 110. In an exemplary embodiment, the receptacle cage 110 encloses and provides electrical shielding for the communication connector 112. The pluggable modules 106 are loaded into the receptacle cage 110 and are at least partially surrounded by the receptacle cage 110. The communication connector 112 extend longitudinally for mating with the pluggable module 106 generally in a loading direction of the pluggable module 106 into the receptacle cage 110. The communication connector 112 is configured to mate with a bottom of the pluggable module 106 along the length of the pluggable module 106 rather than mating with the end of the pluggable module as is typical of conventional I/O transceiver modules. In an exemplary embodiment, the receptacle cage 110 is oriented vertically (for example, on the narrow edge) rather than horizontally as is typical of conventional I/O receptacle cages. The receptacle connector assembly is arranged with the communication connector 112 provided at the bottom of the receptacle cage 110 mounted to the host circuit board 102 and extending a length of the receptacle cage 110 rather than being contained at the rear end of the receptacle cage as is typical of conventional I/O systems.

The receptacle cage 110 includes a plurality of walls 114 defining a cavity 116. The cavity 116 may receive a portion of the communication connector 112. The cavity 116 defines a module channel 118 configured to receive a corresponding pluggable module 106. In an exemplary embodiment, the receptacle cage 110 is a shielding, stamped and formed cage member with the walls 114 being shielding walls 114. For example, the walls 114 may be defined by solid metal sheets or panels in various embodiments. In other various embodiments, the walls 114 may be perforated walls to allow some airflow therethrough but still providing electrical shielding. The walls 114 may include cutouts or openings, such as for a heatsink to pass therethrough for thermal engagement with the pluggable module 106. In other various embodiments, the walls 114 may be defined by rails or beams with relatively large openings, such as for airflow therethrough that forms a frame to support the pluggable module 106 and guide mating of the pluggable module 106 with the communication connector 112 without providing electrical shielding for the cavity 116. For example, the receptacle cage 110 may be open between frame members and the frame members define guide tracks for guiding loading of the pluggable modules 106 into the receptacle cage 110.

In an exemplary embodiment, the receptacle cages 110 may be stacked side-by-side. Front ends of the receptacle cages 110 may be received in corresponding panel openings 120 in a panel 122. The host circuit board 102 is located rearward of the panel 122. The receptacle cages 110 extend rearward from the panel 122 and are mounted to the host circuit board 102. The front ends of the receptacle cages 110 are open and face forward for receiving the pluggable modules 106. The receptacle cages 110 are vertically oriented having heights greater than widths thereof. The heights of the receptacle cages 110 are configured to fit within a 1U rack height in various embodiments. In the illustrated embodiment, the receptacle cages 110 include single module channels 118. However, in alternative embodiments, the receptacle cages 110 may be stacked cages having multiple module channels 118 within the receptacle cage 110.

In an exemplary embodiment, the walls 114 of the receptacle cage 110 include a top wall 130, a bottom wall 132, a first sidewall 134, a second sidewall 136, and a rear wall 138 at a rear 140 of the receptacle cage 110. The walls 114 define the cavity 116. For example, the cavity 116 may be defined by the top wall 130, the bottom wall 132, the sidewalls 134, 136, and the rear wall 138. The receptacle cage 110 may include other walls 114 in other embodiments. The bottom wall 132 may rest on the host circuit board 102. In other various embodiments, the receptacle cage 110 may be provided without the bottom wall 132, such as with the edges of the first and second sidewalls 134, 136 resting on the host circuit board 102. In an exemplary embodiment, a front 142 of the receptacle cage 110 is open and defines a port to receive the pluggable module 106.

In an exemplary embodiment, the receptacle cage 110 may include one or more gaskets 144 at the front 142 for providing electrical shielding for the pluggable module 106. For example, the gaskets 144 may be configured to electrically connect with the pluggable module 106 received in the module channel 118. The gaskets 144 may extend along an exterior of the receptacle cage 110 for interfacing with the panel 122, such as in the panel opening 120 of the panel 122.

In an exemplary embodiment, the receptacle connector assembly 104 may include one or more heat sinks 146 for dissipating heat from the pluggable module 106. For example, the heat sink 146 may be coupled to the first sidewall 134 and/or the second sidewall 136 for engaging the pluggable module 106 received in the module channel 118. The heat sink 146 extends through an opening 148 in the receptacle cage 110 to directly engage the pluggable module 106. The heat sink 146 may be a riding heat sink having springs configured to bias the heat sink 146 inward into thermal engagement with the pluggable module 106 with the pluggable module 106 is loaded into the module cavity 116. The heat sink 146 may be forced outward by the pluggable module 106 when the pluggable module 106 is loaded into the module cavity 116. In an exemplary embodiment, the heat sink 146 includes heat dissipating features, such as fins or posts extending from a base of the heat sink 146 to dissipate heat into the environment around the receptacle connector assembly 104. Other types of heat sinks may be provided in alternative embodiments.

In an exemplary embodiment, the pluggable modules 106 are loaded through the front wall to mate with the communication connector 112. The shielding walls 114 of the receptacle cage 110 provide electrical shielding around the communication connector 112 and the pluggable modules 106, such as around the mating interfaces between the communication connector 112 and the pluggable modules 106.

The communication connector 112 is mounted to the host circuit board 102. The communication connector 112 includes a connector housing 150 holding contacts 152. The contacts 152 are configured to be electrically connected to the pluggable module 106 when mated thereto. The connector housing 150 extends along a longitudinal axis 160 between a front 162 and a rear 164. The connector housing 150 includes a top 166 and a bottom 168. The connector housing 150 includes a first side 170 and a second side 172 that extend between the top 166 and the bottom 168 and that extend between the ends at the front 162 and the rear 164. The connector housing 150 extends a length 174 along the longitudinal axis 160. The length 174 is defined between the front 162 and the rear 164. The first and second sides 170, 172 are parallel to the longitudinal axis 160. The connector housing 150 has a height 175 between the top 166 and the bottom 168. The connector housing 150 has a width 176 between the first side 170 and the second side 172.

The connector housing 150 includes a card slot 180 open at the top 166 of the connector housing 150. Optionally, the card slot 180 may be open at the front 162 in various embodiments. The card slot 180 extends along the longitudinal axis 160 and is configured to receive the pluggable module 106 in a loading direction parallel to the longitudinal axis 160. The plug board of the pluggable module 106 is oriented perpendicular to the host circuit board 102. The contacts 152 are arranged in the card slot 180 along the longitudinal axis 160. For example, the contacts 152 are arranged at different depths within the card slot 180 from the front 162 for mating with a plug board of the pluggable module 106. Optionally, the contacts 152 may be arranged on both sides of the card slot 180. The contacts 152 have mating ends 182 configured to be mated with the plug board of the pluggable module 106. The contacts 152 have terminating ends (not shown) configured to be terminated to the host circuit board 102. For example, the terminating ends may include compliant pins configured to be press-fit into plated vias of the host circuit board 102. Other types of terminating ends may be provided in alternative embodiments, such as solder tails, spring beams, compression contacts, and the like. The contacts 152 may be stamped and formed contacts in various embodiments.

Figure 3:
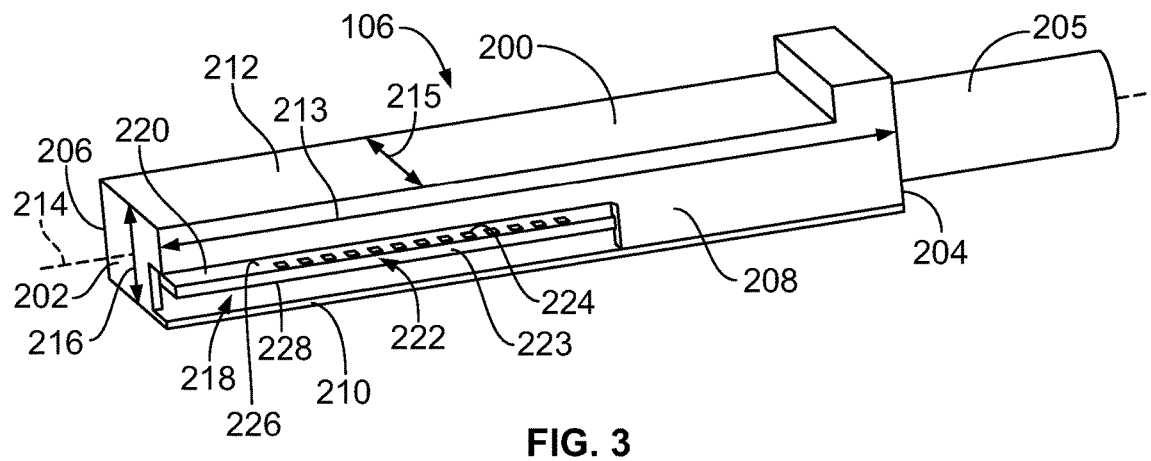
FIG. 3 is a bottom perspective view of a pluggable module of the communication system in accordance with an exemplary embodiment.

FIG. 3 is a bottom perspective view of the pluggable module 106 in accordance with an exemplary embodiment. The pluggable module 106 has a module body 200 and a plug board 220 held by the module body 200. The plug board 220 is configured to be communicatively coupled to the communication connector 112 (shown in FIG. 2). The plug board 220 may be a printed circuit board, a circuit card, a paddle card, a stamped circuit card, connector, and the like. The module body 200 may be defined by one or more shells. The module body 200 may be thermally conductive and/or may be electrically conductive, such as to provide EMI shielding for the pluggable module 106.

The module body 200 includes a first end 202 and an opposite second end 204. The first end 202 defines an insertion end 202 configured to be inserted into the corresponding module channel 118 (shown in FIG. 2). The second end 204 may be a cable end 204 having a cable 205 extending therefrom to another component within the system. The cable 205 may be an electrical cable, an optical cable, and the like. The module body 200 includes a top 206 and a bottom 208. The module body 200 includes a first side 210 and a second side 212 that extend between the top 206 and the bottom 208 and that extend between the first end 202 and the second end 204. The module body 200 extends a length 213 along a longitudinal axis 214. The length 213 is defined between the first end 202 and the second end 204. The first and second sides 210, 212 are parallel to the longitudinal axis 214. The module body 200 has a height 215 between the top 206 and the bottom 208. The module body 200 has a width 216 between the first side 210 and the second side 212. In an exemplary embodiment, pluggable module 106 is configured to be oriented vertically with the height 215 being greater than the width 216, which contrasts with conventional I/O modules that are oriented horizontally with the width being greater than the height of such conventional I/O modules. The pluggable module 106 is configured to be oriented with the narrowest dimension defining the footprint of the pluggable module 106, which allows the pluggable module 106 to occupy less space on the host circuit board 102. The pluggable module 106 is configured to be oriented with the plug board 220 oriented perpendicular to the host circuit board 102.

In an exemplary embodiment, the module body 200 includes a board slot 218 opening at the bottom 208. The board slot 218 exposes the plug board 220. The board slot 218 is sized and shaped to receive a portion of the communication connector 112 when the pluggable module 106 is mated with the communication connector 112. Optionally, the board slot 218 may be open at the first end 202 to receive a portion of the communication connector 112 when the pluggable module 106 is mated with the communication connector 112.

The plug board 220 includes a mating edge 222. In an exemplary embodiment, the plug board 220 is oriented within the module body 200 in a vertical orientation with the mating edge 222 provided at a bottom 223 of the plug board 220. The mating edge 222 extends longitudinally between the first and second edges 202, 204 of the module body 200. The mating edge 222 is exposed in the board slot 218 for mating with the communication connector 112. The plug board 220 may include components, circuits and the like used for operating and or using the pluggable module 106. For example, the plug board 220 may have conductors, traces, pads, electronics, sensors, controllers, switches, inputs, outputs, and the like associated with the plug board 220, which may be mounted to the plug board 220, to form various circuits. The plug board 220 includes contact pads 224 at the mating edge 222 for mating with the communication connector 112. In an exemplary embodiment, the contact pads 224 are provided at a first surface 226 and/or a second surface 228 of the circuit board 220 at the mating edge 222 for mating with corresponding contacts of the communication connector 112.

Figure 4:
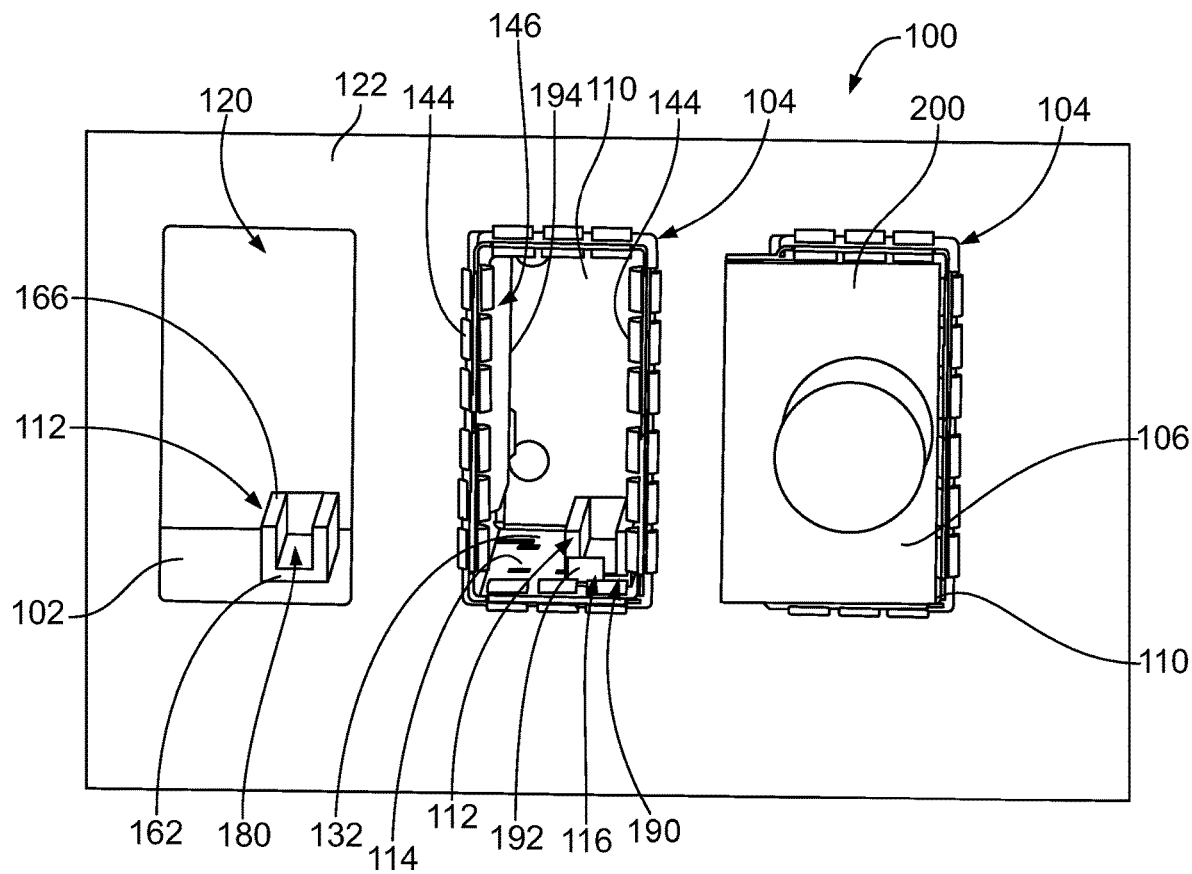
FIG. 4 is a front view of a portion of the communication system showing various components thereof in accordance with an exemplary embodiment.

FIG. 4 is a front view of a portion of the communication system 100 showing various components thereof. On the right side, FIG. 4 illustrates one of the pluggable modules 106 loaded into the corresponding receptacle connector assembly 104. The gaskets 144 are electrically connected to the module body 200 of the pluggable module 106. The gaskets 144 are electrically connected to the panel 122, such as being flexed against edges of the panel 122 defining the panel opening 120.

In the middle, FIG. 4 illustrates one of the receptacle connector assemblies 104. The receptacle cage 110 extends through the panel opening 120. The walls 114 of the receptacle cage 110 surround the cavity 116. In an exemplary embodiment, the bottom wall 132 includes an opening 190 that receives the communication connector 112. The card slot 180 of the communication connector 112 is open at the top 166 and the front 162 to receive the plug board 220 (shown in FIG. 3) of the pluggable module 106. Optionally, the receptacle cage 110 may include one or more grounding fingers 192 configured to be electrically connected to the module body 200. The grounding fingers 192 may be deflectable and spring biased against the pluggable module 106. In an exemplary embodiment, the heat sink 146 includes a mating interface 194 exposed within the cavity 116 for interfacing with the module body 200 of the pluggable module 106. The heat sink 146 is configured to be in thermal contact with the module body 200 to dissipate heat from the pluggable module 106.

On the left side, FIG. 4 illustrates the panel opening 120 without any receptacle cage 110. The communication connector 112 is aligned with the panel opening 120. Optionally, a receptacle cage 110 may be mounted to the host circuit board 102 and extend into the panel opening 120. In other various embodiments, the communication connector 112 may be electrically connected to a corresponding pluggable module 106 without the receptacle cage 110.

Figure 5:
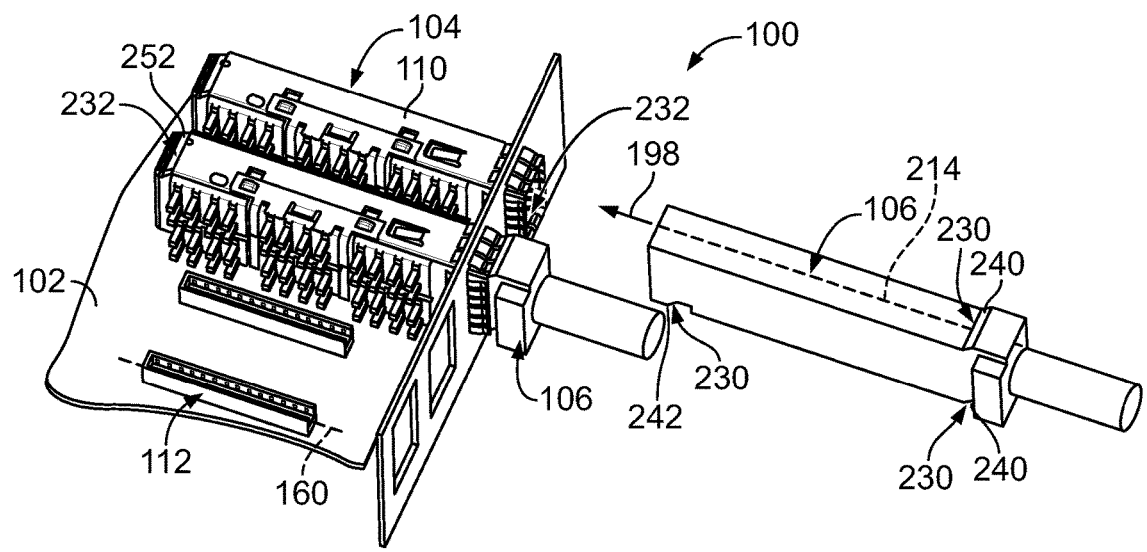
FIG. 5 is a front perspective view of a portion of the communication system in accordance with an exemplary embodiment.
Figure 6:
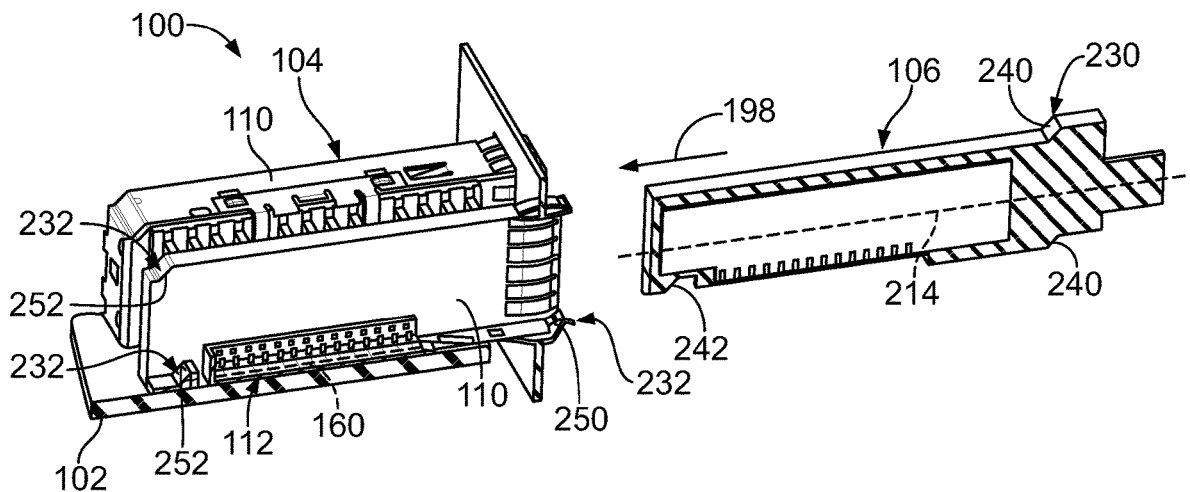
FIG. 6 is a partial sectional view of a portion of the communication system in accordance with an exemplary embodiment.

FIG. 5 is a front perspective view of a portion of the communication system 100 in accordance with an exemplary embodiment. FIG. 6 is a partial sectional view of a portion of the communication system 100 in accordance with an exemplary embodiment. FIG. 6 illustrates one of the pluggable modules 106 poised for loading into the corresponding receptacle cage 110 in a loading direction 198. FIG. 5 illustrates two of the receptacle connector assemblies 104 with the receptacle cage is 110 mounted to the host circuit board 102. FIG. 5 illustrates two of the receptacle connector assemblies 104 with the receptacle cages 110 removed to illustrate the communication connectors 112. FIG. 5 illustrates one pluggable module 106 loaded into the corresponding receptacle cage 110 and another pluggable module 106 poised for loading into the corresponding receptacle cage 110 in the loading direction 198.

In an exemplary embodiment, the pluggable module 106 includes pluggable module guidance features 230 and the receptacle connector assembly 104 includes receptacle guidance features 232 that guide mating and unmating of the pluggable module 106 with the receptacle connector assembly 104. The guidance features 230, 232 may control mating and unmating in a mating direction/un-mating direction that is transverse to the longitudinal axes 160, 214. For example, the mating and un-mating may be in a direction closer to a vertical direction rather than a horizontal direction. The guidance features 230, 232 may convert movement of the pluggable module 106 in the loading direction to movement in the mating direction. The guidance features 230, 232 may be cam features, ramp features or other types of guidance features.

In an exemplary embodiment, the pluggable module guidance features 230 include a front ramp 240 and a rear ramp 242. Other types of guidance feature pluggable module guidance features 230 may be provided in alternative embodiments. In an exemplary embodiment, the guidance feature receptacle guidance features 230 include a front ramp 250 and a rear ramp 252. Other types of receptacle guidance features 232 may be provided in alternative embodiments. The guidance features 230, 232 may interact with each other or with other features of the pluggable module 106 or the receptacle cage 110 to guide mating of the pluggable module 106 with the receptacle connector assembly 104.

Figure 7:
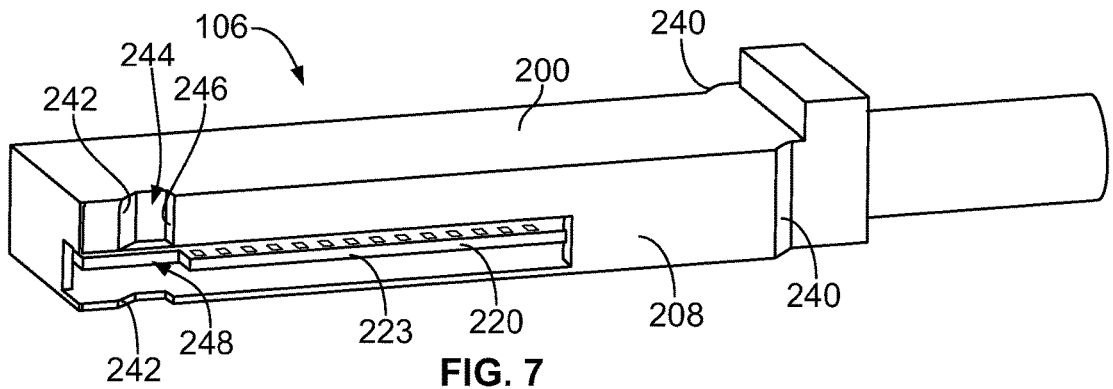
FIG. 7 is a bottom perspective view of the pluggable module in accordance with an exemplary embodiment.

FIG. 7 is a bottom perspective view of the pluggable module 106 in accordance with an exemplary embodiment. FIG. 7 illustrates the front ramp 240 and the rear ramp 242 along the bottom 208 of the module body 200. In the illustrated embodiment, the ramps 240, 242 are forward and downward facing. The ramps 240, 242 may be angled at similar angles, such as approximately 45°. The angles of the ramps 240, 242 may control the mating and/or un-mating direction, which may be parallel to the ramps 240, 242. The module body 200 includes pockets 244 forward of the rear ramps 242. The pockets 244 are configured to receive portions of the receptacle connector assembly 104 when mated. In an exemplary embodiment, a stop wall 246 is provided at a front of the pockets 244. The stop wall 246 is configured to engage a portion of the receptacle connector assembly 104 to stop rearward movement of the pluggable module 106 relative to the receptacle connector assembly 104. Optionally, a portion of the plug board 220 may include a notch 248 along the bottom 223 of the plug board 220. The notch 248 is configured to receive a portion of the receptacle connector assembly 104 when mated thereto.

Figure 8:
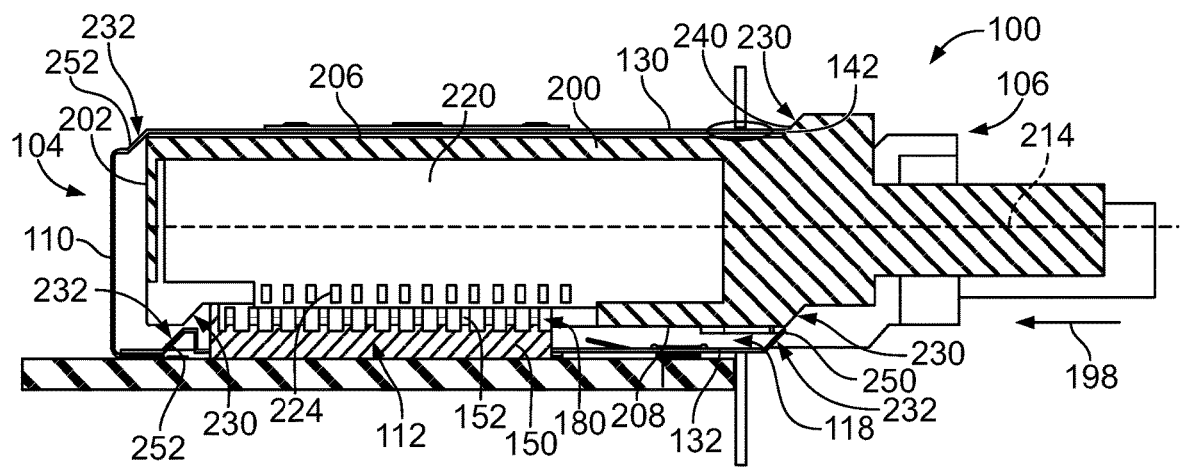
FIG. 8 is a cross-sectional view of a portion of the communication system showing the pluggable module partially loaded into a receptacle connector assembly of the communication system in accordance with an exemplary embodiment.
Figure 9:
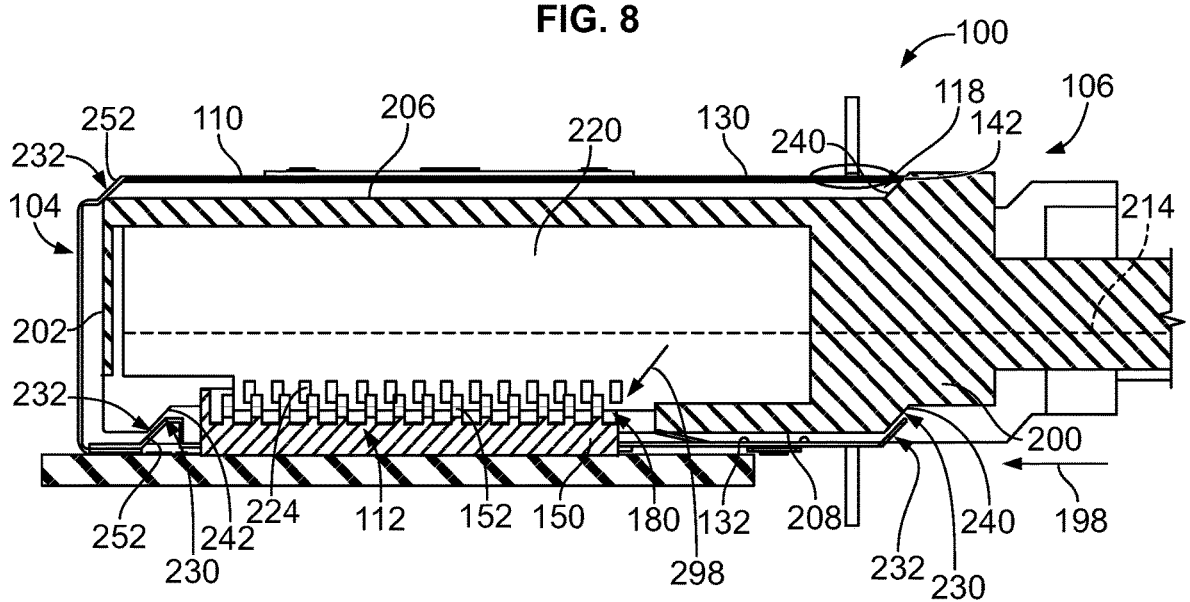
FIG. 9 is a cross-sectional view of a portion of the communication system showing the pluggable module partially loaded into the receptacle connector in accordance with an exemplary embodiment.
Figure 10:
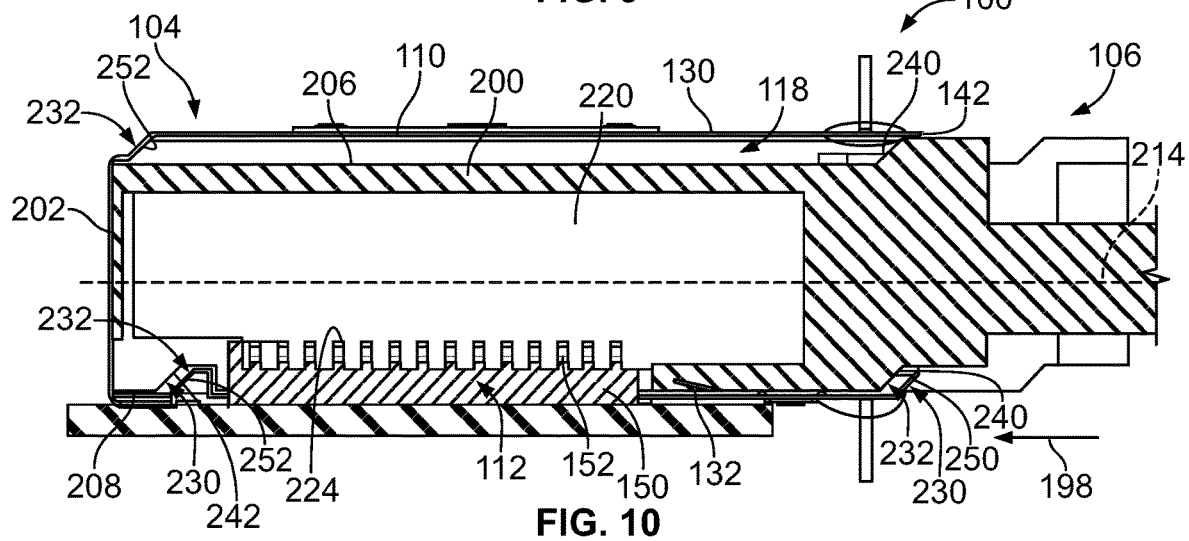
FIG. 10 is a cross-sectional view of a portion of the communication system showing the pluggable module loaded into the receptacle connector assembly in accordance with an exemplary embodiment.

FIG. 8 is a cross-sectional view of a portion of the communication system 100 showing the pluggable module 106 partially loaded into the receptacle connector assembly 104. FIG. 9 is a cross-sectional view of a portion of the communication system 100 showing the pluggable module 106 partially loaded into the receptacle connector assembly 104. FIG. 10 is a cross-sectional view of a portion of the communication system 100 showing the pluggable module 106 loaded into the receptacle connector assembly 104.

The pluggable module 106 is loaded into the receptacle cage 110 in the loading direction 198, such as by pushing the pluggable module 106 rearward into the module channel 118. To avoid having the contact pads 224 of the plug board 220 wipe along the contacts 152 of the communication connector 112 as the pluggable module 106 is loaded into the receptacle connector assembly 104, the pluggable module 106 is loaded into the receptacle cage 110 at an elevated position (FIG. 8). As the pluggable module 106 approaches the final or rearward loaded position (FIG. 9), the pluggable module 106 may be seated downward in the receptacle cage 110. The plug board 220 is seated downward into the card slot 180 of the connector housing 150. In the final, mated position (FIG. 10), the pluggable module 106 is seated in the receptacle cage 110 and the communication connector 112 such that the contact pads 224 are electrically connected to corresponding contacts 152. Optionally, the pluggable module 106 may be held in the receptacle cage 110 by one or more latching features (not shown) that resist un-mating of the pluggable module 106 from the receptacle connector assembly 104 until the latching features are unlatched.

In an exemplary embodiment, the plug board 220 is mated in a mating direction 298 that is transverse to the loading direction 198. The mating direction 298 is nonparallel to the longitudinal axis 214. The mating direction 298 may be approximately 45°. For example, the mating direction 298 may be generally downward and rearward. The guidance features 230, 232 guide mating of the plug board 220 with the communication connector 112 in the mating direction 298. For example, the front ramp 240 of the pluggable module 106 may engage the receptacle cage 110 to force the pluggable module 106 in the mating direction 298. For example, the front ramp 240 at the top 206 of the module body 200 engages the front 142 of the receptacle cage 110 and forces the pluggable module 106 in the mating direction 298. Optionally, the front ramp 240 at the bottom 208 of the module body 200 clears the front ramp 250 at the bottom wall 132 of the receptacle cage 110 to allow the pluggable module 106 to move in the mating direction 298. The rear ramp 252 of the receptacle cage 110 may engage the pluggable module 106 to force the pluggable module 106 in the mating direction 298. For example, the rear ramp 252 at the top wall 130 of the receptacle cage 110 engages the first end 202 of the module body 200 to force the pluggable module 106 in the mating direction 298. Optionally, the rear ramp 242 at the bottom 208 of the module body 200 clears the rear ramp 252 at the bottom wall 132 of the receptacle cage 110 to allow the pluggable module 106 to move in the mating direction 298.

The pluggable module 106 may be unmated from the receptacle connector assembly 104 in a reverse fashion by pulling the pluggable module 106 out of the receptacle cage 110. The guidance features 230, 232 guide un-mating of the pluggable module 106 from the communication connector 112. For example, the front and rear ramps 240, 242 engage the front and rear ramps 250, 252 to move the pluggable module 106 in an un-mating direction opposite the mating direction 298. The pluggable module 106 may then be pulled out of the receptacle cage 110 in an unloading direction opposite the loading direction 198.

Figure 11:
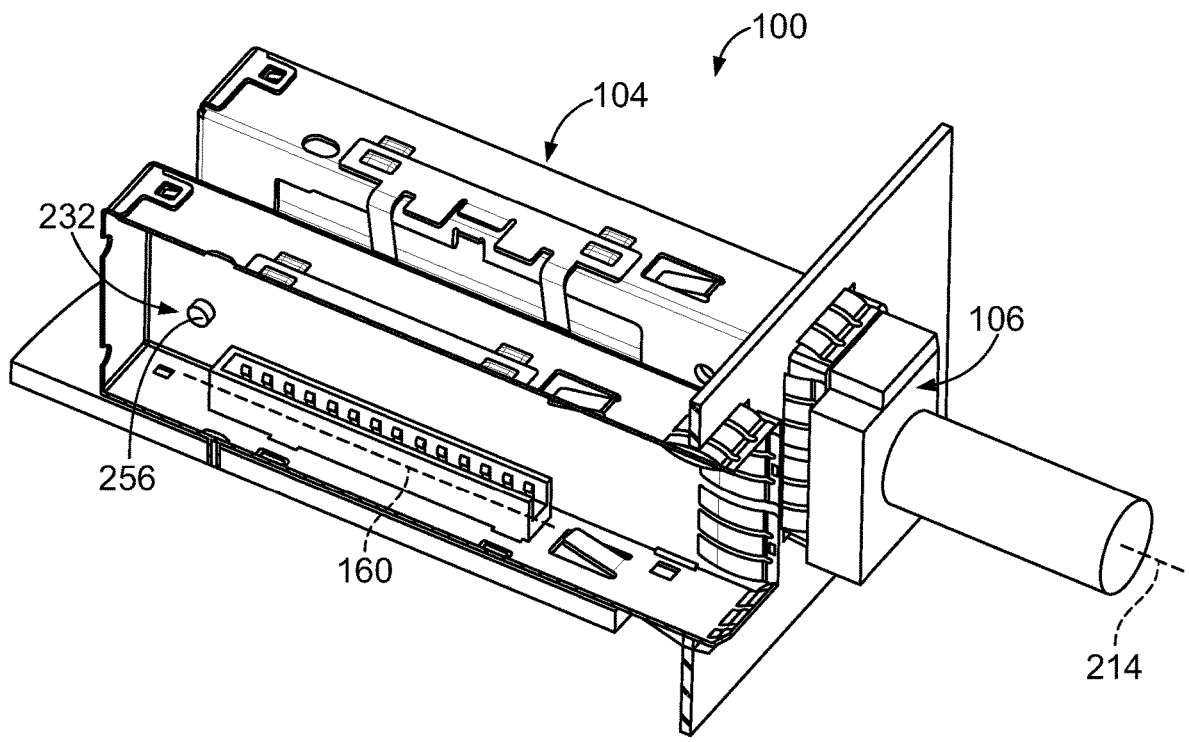
FIG. 11 is a partial sectional view of a portion of the communication system in accordance with an exemplary embodiment.

FIG. 11 is a partial sectional view of a portion of the communication system 100 in accordance with an exemplary embodiment. In an exemplary embodiment, the receptacle guidance features 232 are cam pins 256 that guide mating and unmating of the pluggable module 106 with the receptacle connector assembly 104. The cam pins 256 are located on the internal body of the receptacle configured to be received in cam slots in the pluggable module 106 to control mating and unmating in a mating direction/un-mating direction that is transverse to the longitudinal axes 160, 214. The cam pins 256 convert movement of the pluggable module 106 in the loading direction to movement in the mating direction.

Figure 12:
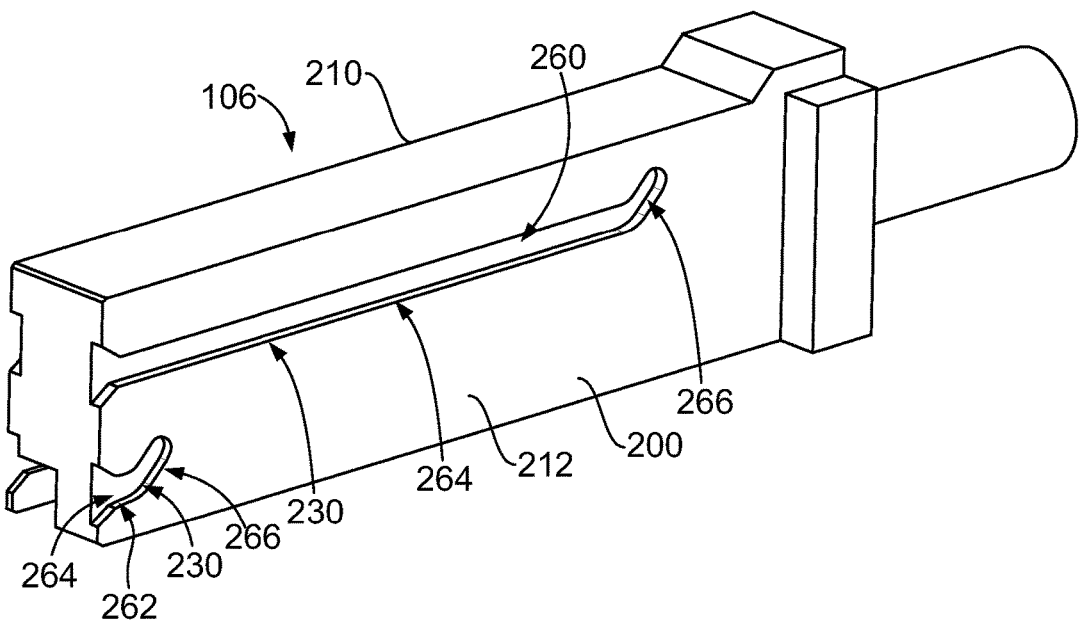
FIG. 12 is a perspective view of the pluggable module in accordance with an exemplary embodiment.

FIG. 12 is a perspective view of the pluggable module 106 in accordance with an exemplary embodiment. In an exemplary embodiment, the pluggable module guidance features 230 are upper and lower cam slots 260, 262 extending along the first and second sides 210, 212 of the module body 200. Other types of guidance features 230 may be provided in alternative embodiments. In an exemplary embodiment, the cam slots 260, 262 include longitudinal tracks 264 and transverse tracks 266 extending from the longitudinal tracks 264 at ends of the cam slots 260, 262. The transverse tracks 266 are angled transverse to the longitudinal tracks 264. The cam slots 260, 262 receive corresponding cam pins 256 (shown in FIG. 11) to guide loading and mating of the pluggable module 106 with the receptacle connector assembly 104. The pluggable module 106 is moved in the loading direction 198 as the cam pins 256 traverse through the longitudinal tracks 264 and the pluggable module 106 is moved in the mating direction 298 as the cam pins 256 traverse through the transverse tracks 266. The angle of the transverse tracks 266 controls the angle of mating and unmating of the pluggable module 106 with the communication connector 112 (shown in FIG. 11).

Figure 13:
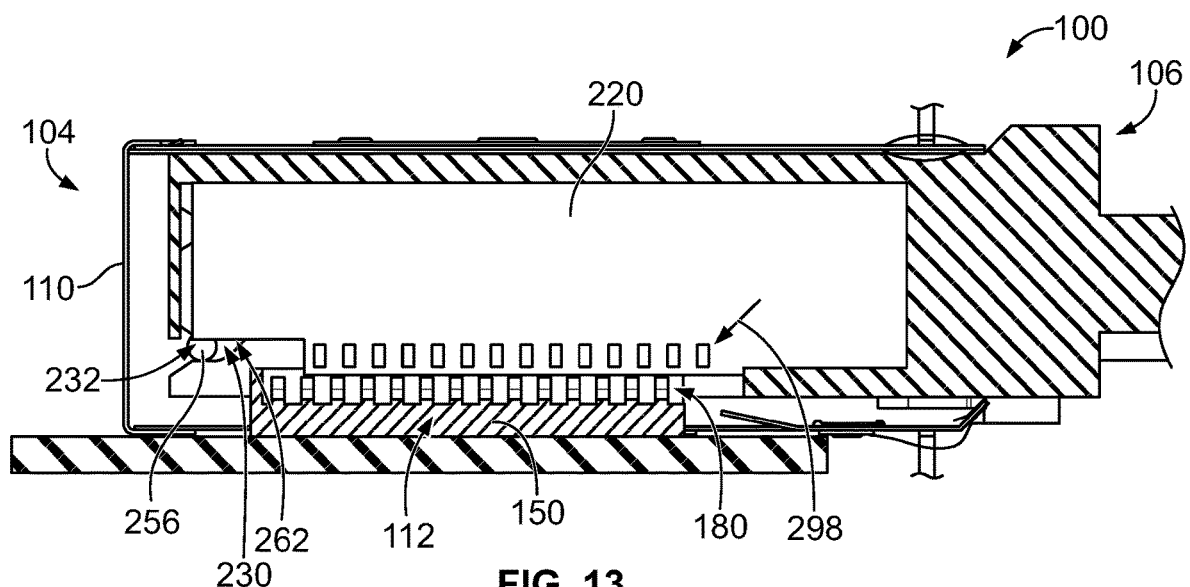
FIG. 13 is a cross-sectional view of a portion of the communication system showing the pluggable module partially loaded into the receptacle connector assembly in accordance with an exemplary embodiment.
Figure 14:
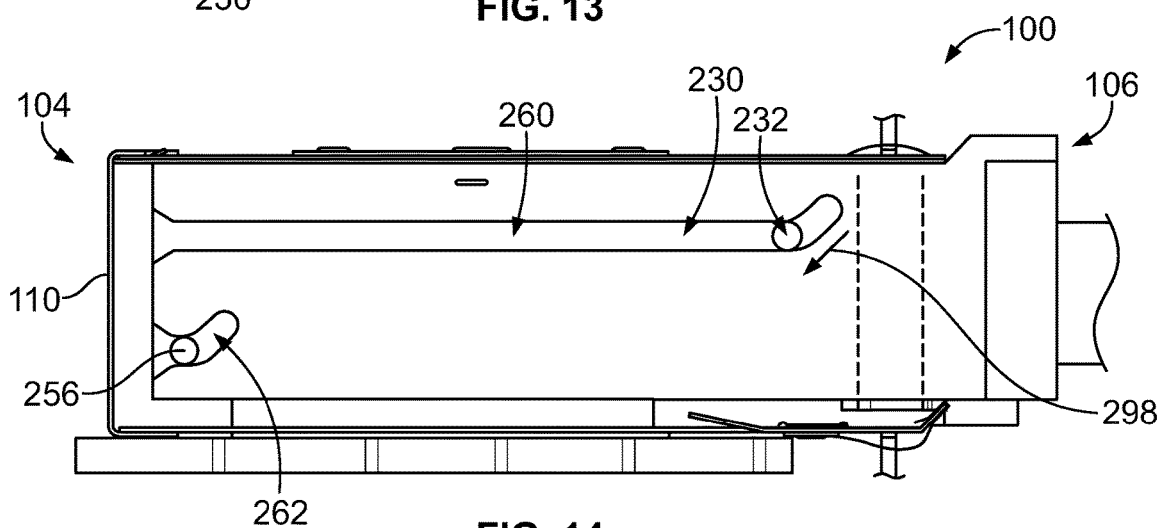
FIG. 14 is a cross-sectional view of a portion of the communication system showing the pluggable module partially loaded into the receptacle connector in accordance with an exemplary embodiment.
Figure 15:
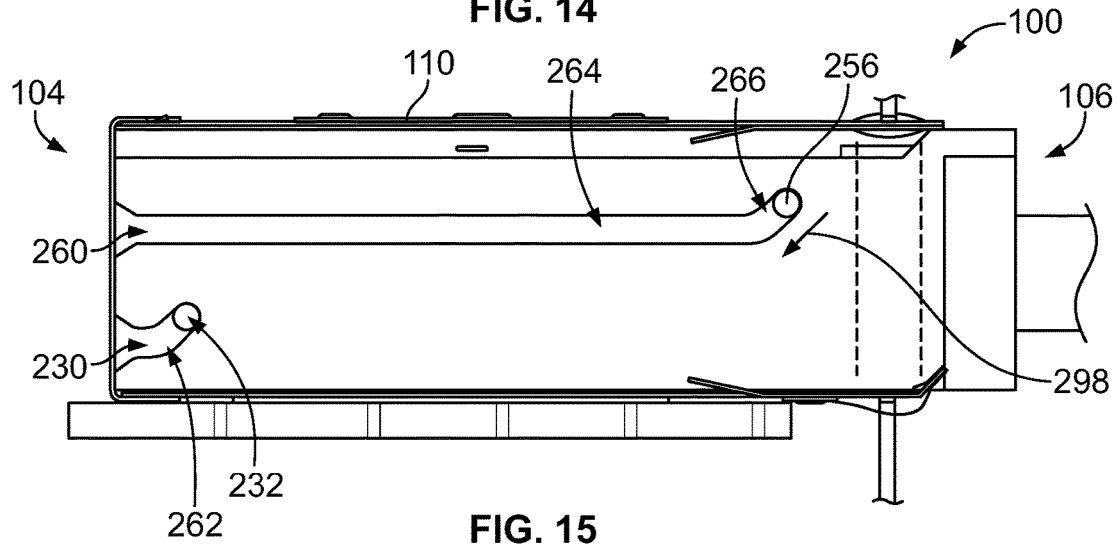
FIG. 15 is a cross-sectional view of a portion of the communication system showing the pluggable module loaded into the receptacle connector assembly in accordance with an exemplary embodiment.

FIG. 13 is a cross-sectional view of a portion of the communication system 100 showing the pluggable module 106 partially loaded into the receptacle connector assembly 104. FIG. 14 is a cross-sectional view of a portion of the communication system 100 showing the pluggable module 106 partially loaded into the receptacle connector assembly 104. FIG. 15 is a cross-sectional view of a portion of the communication system 100 showing the pluggable module 106 loaded into the receptacle connector assembly 104. FIG. 13 illustrates the plug board 220 relative to the communication connector 112 in the partially loaded position showing the plug board 220 elevated above the communication connector 112. FIGS. 14 and 15 illustrate the interaction between the cam pins 256 and the cam slots 260, 262.

During loading, as the pluggable module 106 approaches the final or rearward loaded position, the pluggable module 106 may be seated downward in the receptacle cage 110. The plug board 220 is seated downward into the card slot 180 of the connector housing 150 during mating. The pluggable module 106 is moved in the loading direction 198 as the cam pins 256 ride along the longitudinal tracks 264. The pluggable module 106 is moved in the mating direction 298 is the cam pins 256 ride along the transverse tracks 266. The mating direction 298 may be approximately 45°. For example, the mating direction 298 may be generally downward and rearward. The pluggable module 106 may be unmated from the receptacle connector assembly 104 in a reverse fashion by pulling the pluggable module 106 out of the receptacle cage 110. The guidance features 230, 232 guide un-mating of the pluggable module 106 from the communication connector 112. For example, the cam pins 256 may ride down the transverse tracks 266 to the longitudinal tracks 264 to move the pluggable module 106 in the un-mating direction.

Figure 16:
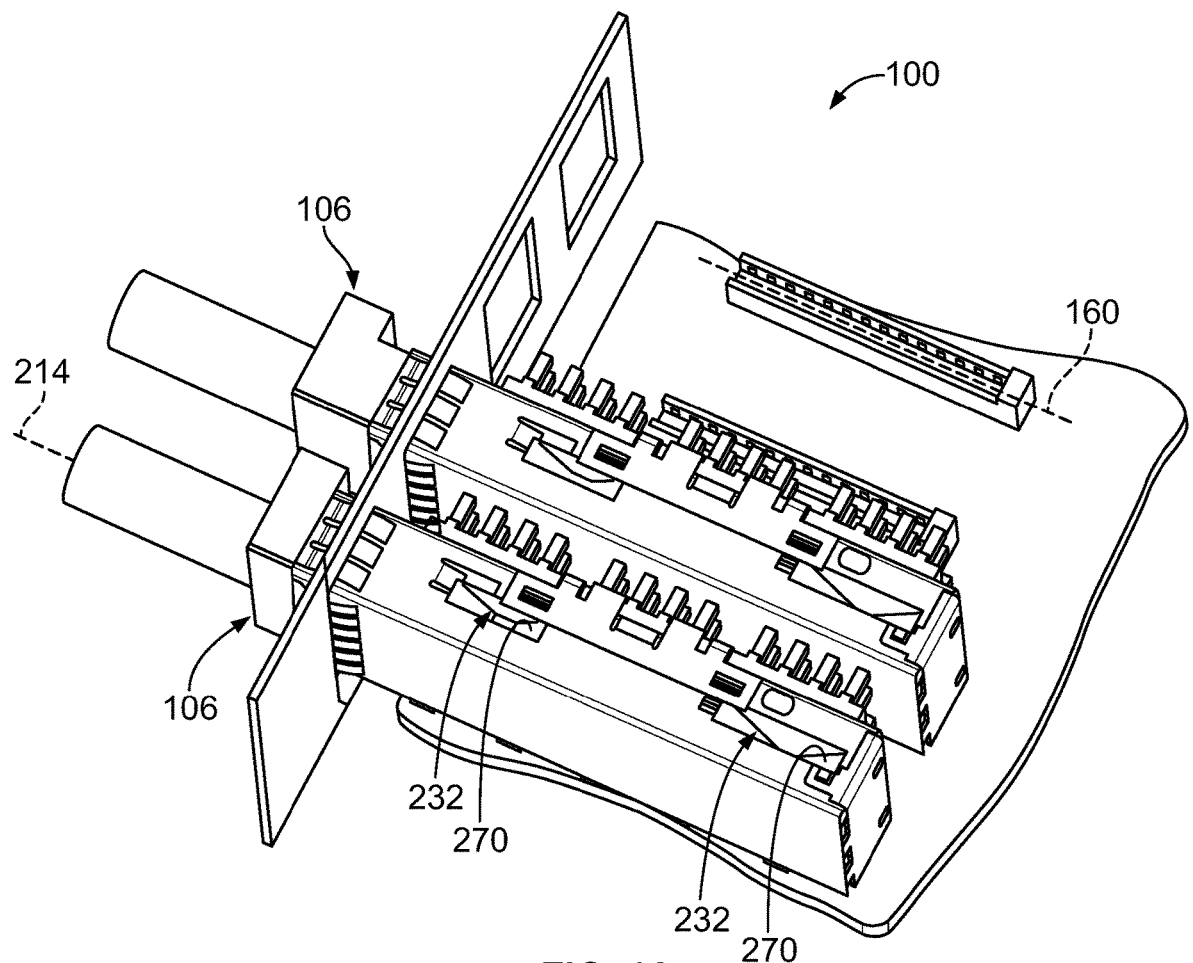
FIG. 16 is a partial sectional view of a portion of the communication system in accordance with an exemplary embodiment.

FIG. 16 is a partial sectional view of a portion of the communication system 100 in accordance with an exemplary embodiment. In an exemplary embodiment, the receptacle guidance features 232 are cam ramps 270 that interface with rotating cams 272 (shown in FIG. 17) of the pluggable module 106 to control mating and unmating in a mating direction/un-mating direction that is transverse to the longitudinal axes 160, 214. The cam ramps 270 of the receptacle convert movement of the pluggable module 106 in the loading direction to movement of the plug board 220 in the mating direction.

Figure 17:
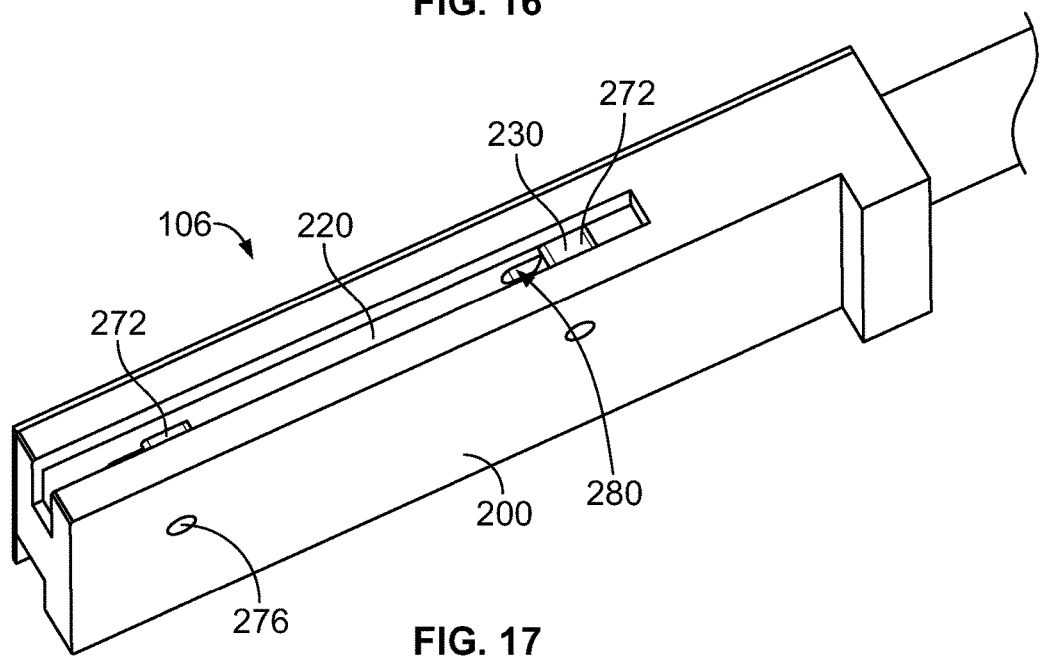
FIG. 17 is a perspective view of the pluggable module in accordance with an exemplary embodiment.
Figure 18:
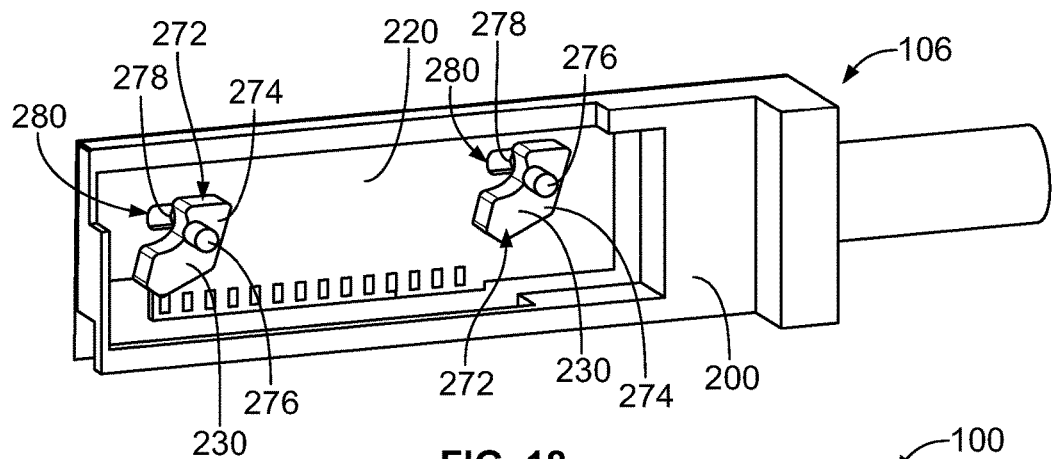
FIG. 18 is a partial sectional view of the pluggable module in accordance with an exemplary embodiment.

FIG. 17 is a perspective view of the pluggable module 106 in accordance with an exemplary embodiment. FIG. 18 is a partial sectional view of the pluggable module 106 in accordance with an exemplary embodiment. In an exemplary embodiment, the pluggable module guidance features 230 are rotating cams 272 coupled between the module body 200 and the plug board 220. The rotating cam 272 includes a pivot body 274 having a first pin 276 configured to be coupled to the module body 200 and a second pin 278 (shown in phantom) configured to be coupled to the plug board 220. The second pin 278 is received in a slot 280 and the plug board 220. The second pin 278 is slidable within the slot 280. In an exemplary embodiment, the first pin 276 is offset relative to the second pin 278. The first pin 276 is configured to be fixed relative to the module body 200. Rotation of the pivot body 274 causes the second pin 278 to move horizontally and vertically relative to the first pin 276. Rotation of the rotating cam 272 causes the plug board 220 to move relative to the module body 200. For example, as the pivot body 274 rotates, the second pin 278 is moved vertically to move the plug board 220 in a vertical mating direction. Horizontal movement of the second pin 278 occurs within the slot 280. Other types of guidance feature pluggable module guidance features 230 may be provided in alternative embodiments.

Figure 19:
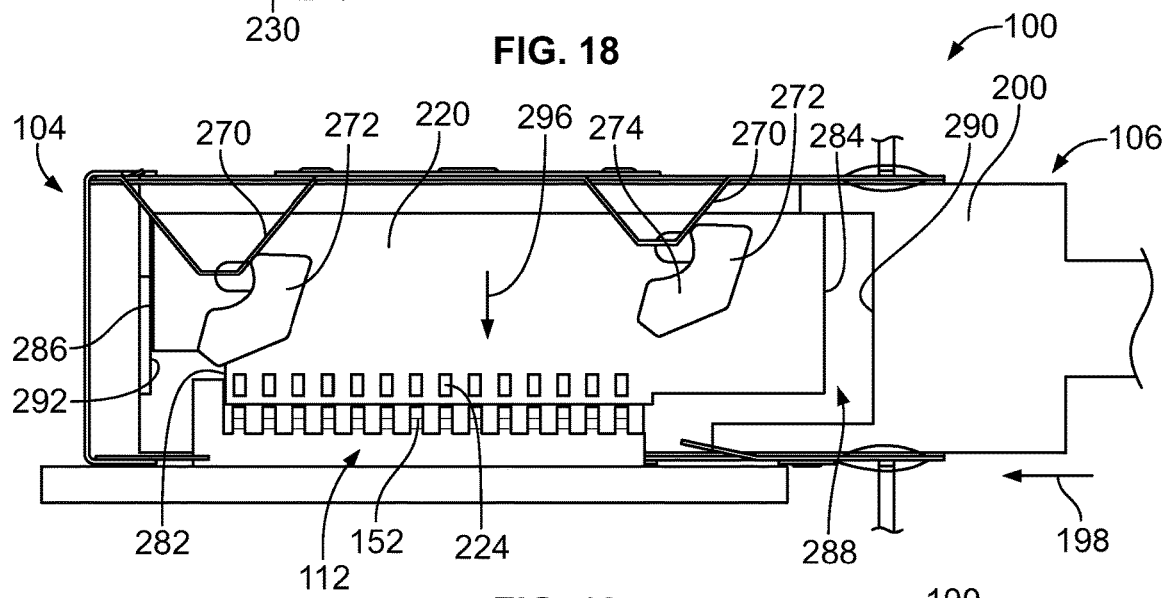
FIG. 19 is a cross-sectional view of a portion of the communication system showing the pluggable module partially loaded into the receptacle connector assembly in accordance with an exemplary embodiment.
Figure 20:
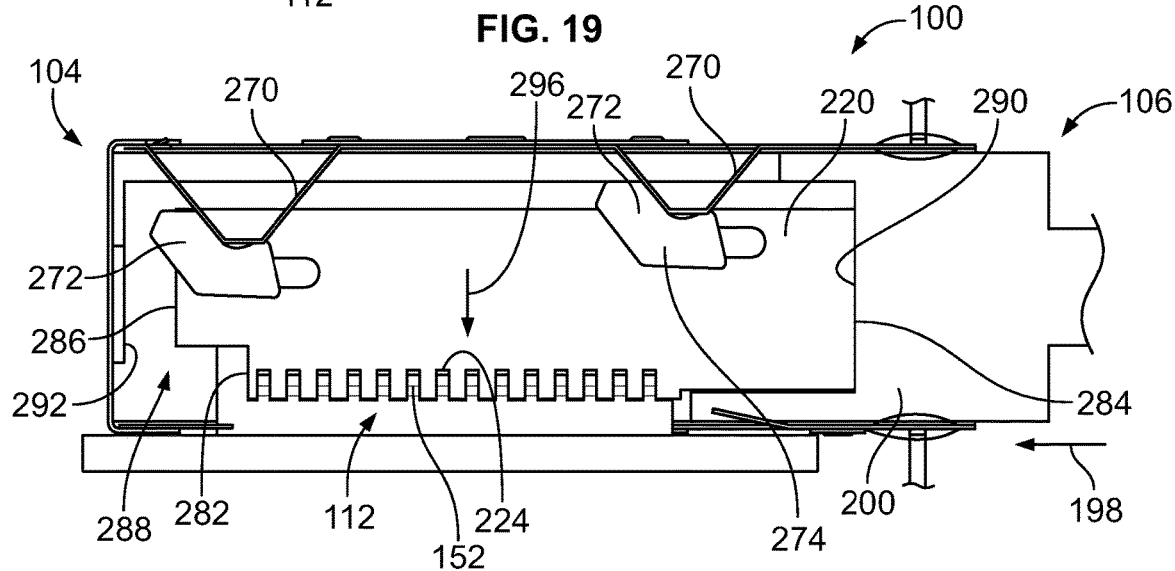
FIG. 20 is a cross-sectional view of a portion of the communication system showing the pluggable module loaded into the receptacle connector assembly in accordance with an exemplary embodiment.

FIG. 19 is a cross-sectional view of a portion of the communication system 100 showing the pluggable module 106 partially loaded into the receptacle connector assembly 104. FIG. 20 is a cross-sectional view of a portion of the communication system 100 showing the pluggable module 106 loaded into the receptacle connector assembly 104. FIGS. 19 and 20 illustrate the interaction between the rotating cams 272 and the cam ramps 270. The cam ramps 270 are used to rotate the rotating cams 272. As the module body 200 is moved rearward in the loading direction 198 the pivot body 274 engages the cam ramp 270. Further rearward movement of the module body 200 and the loading direction 198 causes the pivot body 274 to rotate. Rotation of the pivot body 274 causes the plug board 220 to move in a mating direction 296 to mate the plug board 220 with the communication connector 112. In the illustrated embodiment, the mating direction 296 is a vertical mating direction. The plug board 220 is moved vertically relative to the module body 200. As such, the contact pads 224 may be mated in a vertical mating direction with the contacts 152 rather than wiping across the contacts 152. The module body 200 moves horizontally relative to the plug board 220 as the pluggable module 106 is loaded from the partially loaded position (FIG. 19) to the fully loaded position (FIG. 20).

In an exemplary embodiment, the plug board 220 includes a stop edge 282 configured to engage the communication connector 112. The plug board 220 is loaded in a rearward direction into the receptacle connector assembly 104 until the stop edge 282 engages the communication connector 112. Further rearward movement of the pluggable module 106 in the loading direction 198 causes the module body 200 to move relative to the plug board 220. The plug board 220 includes a front edge 284 and a rear edge 286. The plug board 220 is received in a pocket 288 of the module body 200 such that the front edge 284 faces a front wall 290 of the pocket 288 and the rear edge 286 faces a rear wall 292 of the pocket 288. Prior to the rotating cam 272 being rotated, the rear edge 286 of the plug board 220 may abut against the rear wall 292 and the front edge 284 may be spaced apart from the front wall 290 of the pocket 288. After the rotating cam 272 is rotated, the rear edge 286 of the plug board 220 may be spaced apart from the rear edge 286 of the pocket 288 and the front edge 284 may abut against the front wall 290 of the pocket 288.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A communication system comprising:
a receptacle connector assembly comprising a receptacle cage and a communication connector received in the receptacle cage and mounted to a host circuit board, the receptacle cage including walls defining a cavity, the walls including a top wall, a first side wall and a second side wall, the top wall, the first side wall and the second side wall extending longitudinally between a front and a rear of the receptacle cage, the first and second side walls extending from the top wall to a bottom of the receptacle cage, the bottom being mounted to the host circuit board, the cavity including a module channel between the first and second side walls, the communication connector including a connector housing holding contacts, the connector housing extending between a front and a rear, a bottom of the connector housing being mounted to the host circuit board, the connector housing including a card slot open at a top of the connector housing, the card slot extending along a longitudinal axis between the front and the rear of the connector housing, the contacts being arranged along the longitudinal axis; and a pluggable module received in the module channel in a loading direction, the pluggable module including a module body having a top, a bottom, a first side, a second side, a first end, and a second end, the first end being loaded into the receptacle cage, the pluggable module including a plug board having a mating edge and contact pads arranged along the mating edge, the plug board being held in the module body in a vertical orientation with the mating edge at a bottom of the plug board, the mating edge being received in the card slot with the contact pads electrically coupled to corresponding contacts of the communication connector;

wherein the plug board is oriented perpendicular to the host circuit board.

2. The communication system of claim 1, wherein the receptacle cage includes a height between the top wall and the bottom, the receptacle cage including a width between the first side wall and the second side wall, the height being greater than the width.

3. The communication system of claim 1, wherein the pluggable module includes a height between the top and the bottom, the pluggable module including a width between the first side and the second side, the height being greater than the width, the plug board being oriented in a height direction.

4. The communication system of claim 1, wherein the module body includes a board slot at the bottom, the mating edge being exposed through the board slot.

5. The communication system of claim 1, wherein the mating edge extends longitudinally between the first end and the second end of the module body.

6. The communication system of claim 1, wherein the communication connector is located between the host circuit board and the plug board.

7. The communication system of claim 1, wherein the receptacle cage is closed by the top wall, the card slot being open at the top of the connector housing to receive the plug board, the module channel being open at the front to receive the pluggable module in the loading direction.

8. The communication system of claim 1, wherein the card slot is open at the front of the connector housing to receive the plug board in the loading direction.

9. The communication system of claim 1, wherein the pluggable module includes a pluggable module guidance feature and the receptacle connector assembly includes a receptacle guidance feature interacting with the pluggable module guidance feature to guide loading of the pluggable module into the module channel.

10. The communication system of claim 9, wherein the pluggable module guidance feature and the receptacle guidance feature control a mating direction of the plug board with the communication connector in the card slot in a mating direction nonparallel to the longitudinal axis.

11. The communication system of claim 1, wherein the pluggable module includes a guidance feature including a ramp angled transverse to the longitudinal axis, the ramp engaging the receptacle connector assembly to move the pluggable module in a direction parallel to the ramp as the pluggable module is loaded into the module channel.

12. The communication system of claim 1, wherein the pluggable module includes a guidance feature including a cam slot extending along a path nonparallel to the longitudinal axis, the cam slot receiving a cam pin of the receptacle connector assembly to guide mating of the pluggable module with the receptacle cage during loading of the pluggable module into the receptacle cage.

13. The communication system of claim 1, wherein the plug board is coupled to the module body by a rotating cam, the rotating cam engaging the receptacle connector assembly to move the plug board relative to the module body in a mating direction transverse to the loading direction.

14. The communication system of claim 1, wherein the receptacle cage includes an opening in the first side wall, the receptacle connector assembly including a heat sink received in the opening to engage the pluggable module in the module channel.

15. The communication system of claim 1, wherein the receptacle connector assembly includes a panel forward of the host circuit board, the panel including a panel opening receiving the front of the receptacle cage, the receptacle cage extending rearward of the panel, the pluggable module being loaded into the module channel from an area forward of the panel.

16. The communication system of claim 1, wherein the first end is an insertion end of the pluggable module, the pluggable module having a cable electrically connected to the plug board, the cable extending from the second end of the module body.

17. A receptacle connector assembly for a communication system comprising:

a receptacle cage including walls defining a cavity, the walls including a top wall, a first side wall and a second side wall, the top wall, the first side wall and the second side wall extending along a longitudinal axis between a front and a rear of the receptacle cage, the first and second side walls extending from the top wall to a bottom of the receptacle cage, the bottom being mounted to a host circuit board, the cavity including a module channel between the first and second side walls configured to receive a pluggable module in a loading direction parallel to the longitudinal axis; and a communication connector received in the receptacle cage, the communication connector including a connector housing holding contacts, the connector housing extending between a front and a rear, a bottom of the connector housing being mounted to the host circuit board, the connector housing including a card slot open at a top of the connector housing for receiving a plug board of the pluggable module that is oriented perpendicular to the host circuit board, the card slot extending along the longitudinal axis between the front and the rear of the connector housing, the contacts being arranged at different depths along the longitudinal axis for mating with corresponding contact pads of the plug board.

18. A pluggable module for a communication system including a receptacle connector assembly having a receptacle cage and a communication connector received in the receptacle cage mounted to a host circuit board, the receptacle cage including a module channel extending longitudinally between a front and a rear of the receptacle cage, the communication connector including a connector housing holding contacts in a card slot open at a top of the connector housing and extending along a longitudinal axis between a front and a rear of the connector housing, the pluggable module comprising:
- a module body having a top, a bottom, a first side, a second side, a first end, and a second end, the first end configured to be loaded into the module channel in a loading direction parallel to the longitudinal axis;
- a plug board having a first surface and a second surface, the plug board having a mating edge at a bottom of the plug board, the plug board including contact pads on at least one of the first surface and the second surface, the contact pads being arranged along the mating edge at the bottom of the plug board, the plug board being held in the module body in a vertical orientation with the mating edge at the bottom of the module body for mating with the communication connector, the mating edge configured to be received in the card slot of the connector housing with the contact pads electrically coupled to corresponding contacts of the communication connector; and
- a cable coupled to the plug board, the cable extending from the second end of the module body;
- wherein the plug board is oriented perpendicular to the host circuit board.

\* \* \* \* \*